May 8, 1945. S. E. MUNYER, JR 2,375,239
SAFETYPIN
Filed Nov. 26, 1943
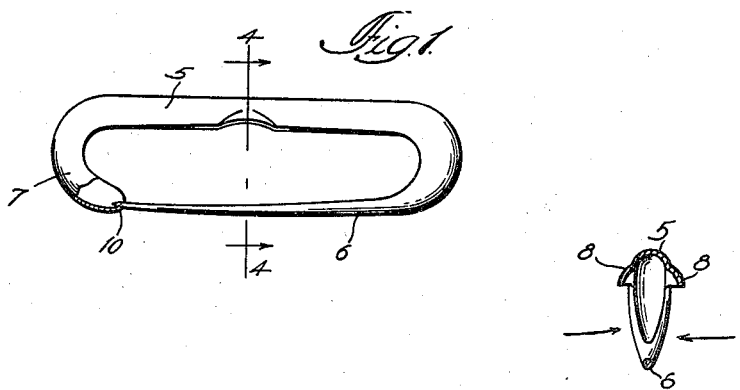
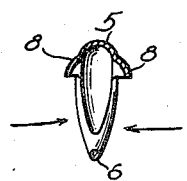
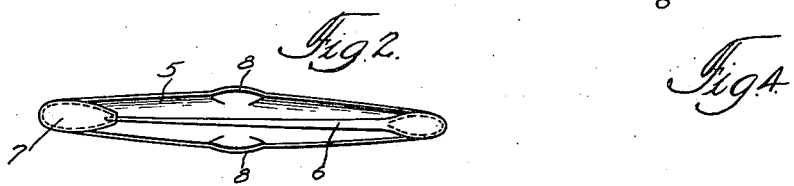
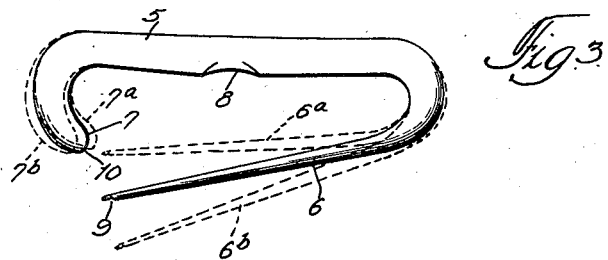
Inventor:
Salem E. Munyer, Jr,
By Thiess, Olson & Mecklenburger
Attys Patented May 8, 1945

2,375,239

UNITED STATES PATENT OFFICE 2,375,239

SAFETY PIN

Salem E. Munyer, Jr., Chicago, Ill.

Application November 26, 1943, Serial No. 511,791

7 Claims. (Cl. 24—161)

My invention relates to safety pins.

This application is a continuation as to common subject matter of my co-pending application Serial Number 418,782, filed November 12, 1941.

One of the objects of my invention is to provide a self-closing safety pin whereby the pin will normally be in a condition which will minimize the danger in the event that a child should happen to swallow it.

A further object of my invention is to provide a safety pin in which the pin may be caused to move from and toward closed position by holding the pin between the thumb and finger and varying the pressure exerted on the pin by the thumb and finger, thus lessening the danger from swallowing the pin and facilitating the insertion and latching of the pin in the goods.

A further object is to provide a safety pin in which the body thereof is formed of spring material and of substantially V-shape in cross section, with its concave side facing the pin member, whereby, upon pressing the sides of the body together intermediate the ends of the body, the guard and pin member will be moved so as to cause disengagement of the pin member from the guard and thereby effect opening of the pin.

A further object of my invention is to provide a safety pin of the above kind in which the body, pin and guard members of the safety pin are integrally formed, and in which the guard member is also of substantially V-shape in cross section and arranged to receive the pointed end of the pin member when the safety pin is closed. Suitable means is provided for effecting interlocking engagement between the guard and the pin member at the pointed end of the latter whereby accidental opening of the pin will be prevented.

Further objects and advantages of the invention will be apparent from the description and claims.

In the drawing,

Figure 1 is a side elevational view, partly broken away and in section, of a safety pin constructed in accordance with the present invention;

Fig. 2 is a bottom plan view thereof;

Fig. 3 is a view similar to Fig. 1 with the pin in open position; and

Fig. 4 is a section on the line 4—4 of Fig. 1.

Referring to the drawing, the construction shown comprises a safety pin comprising a resilient elongated supporting body 5, a pin 6 having the end remote from its point secured to one end of said supporting body 5, a keeper 7 engageable and disengageable by the point of the pin secured to the other end of said body, said resilient body having manually sprung means to cause the point of the pin to disengage the keeper and to force the point of the pin away from the body after it has disengaged the keeper.

Fig. 3 shows different positions which the pin and guard assume, depending on the pressure exerted by the thumb and finger on the elongated collapsible body 5. Positions 6a and 7a show the positions assumed by the pin and guard when only a light pressure is exerted by the thumb and finger on the collapsible supporting body 5 in the direction of the arrows shown in Fig. 4, just sufficient to free the point of the pin from the guard. Positions 6 and 7 show the positions assumed when a moderate pressure is exerted. Positions 6b and 7b show the positions assumed when a fairly strong pressure is exerted. If the pressure is entirely removed, the pin will enter the guard and assume the closed position of the pin. When a strong pressure is applied to move the pin to the position shown at 6b, the pin can be inserted easily into the goods and when the pressure is removed the pin will move or tend to move toward closed position. If the resistance, due to the engagement of the pin with the goods is such as to prevent complete closing, a slight pressure on the pin and elongated body 5 will bring the parts into closed position.

Referring further in detail to the drawing, the present safety pin preferably comprises integral body, pin and guard portions 5, 6 and 7, respectively, the said portions being made of suitable spring material such as spring metal or resilient plastic. The body portion 5 is of substantially V-shape in cross section with its concave side facing the pin member 6. The guard is of similar cross section and is adapted to receive the pointed end of the pin member 6 in the usual general manner. By making the body portion 5 of resilient or springy metal and having the flanges or sides thereof in inwardly diverging relation, compression of the sides of the body 5 intermediate the ends of the latter will cause the ends of the body to move in such a way as to cause the pin member to move outward and downward and simultaneously cause the guard to move outward and upward so as to effect the opening of the pin as illustrated in Fig. 3. In order to facilitate and enhance this action, the intermediate portion of the body 5 is provided at opposite sides with outwardly swelled portions 8 where the same is to be compressed or the sides of the body are to be pressed together. This movement of the guard and pin member is thus emphasized. Suitable means may be provided for providing interlocking engagement between the pointed end of the pin member 6 and the guard 7 when the safety pin is closed so that accidental opening of the pin may not occur under ordinary conditions of use. This may be accomplished in various elementary ways such as by providing transverse grooves in the pin guard and minute transverse protrusions along the pin point that will fit into the grooves when the safety pin is closed. As shown, the pin may also have a groove as at 9 to receive an inturned flange at the end of the guard 7 as at 10. Other conventional interlocking arrangements will suggest themselves to those skilled in the art.

Further modifications will be apparent to those skilled in the art and it is desired, therefore, that the invention be limited only by the scope of the appended claims.

Having thus described my invention, what I claim and desire to secure by Letters Patent is:

1. A safety pin comprising a pin member, a guard adapted to receive and engage the free end of the pin member, and body member of springy material and of substantially V-shape channel cross section with its concave side facing the pin supporting said pin member and guard member in cooperative engagement with the free end of the pin extending into the guard only a relatively short distance past the inner edge of the guard, the sides of said channel flaring outwardly at a portion intermediate its ends to a greater width than adjoining portions, said portion of greater width being constructed and arranged to bend the body portion away from the pin when said portion is pressed to reduce its width, to move the guard and pin outward longitudinally relative to each other a distance sufficient to disengage the free end of the pin from the guard, and also to cause upward movement of the guard member, and simultaneous downward pressure on the pin member to effect the opening of the pin when said free end is disengaged, so that the pin may be inserted into or extracted from engagement with an article.

2. A safety pin comprising a pin member, a guard adapted to receive and engage the free end of the pin member, and body member of springy material and of substantially V-shape channel cross section with its concave side facing the pin supporting said pin member and guard member in cooperative engagement with the free end of the pin extending into the guard only a relatively short distance past the inner edge of the guard, the sides of said channel flaring outwardly at a portion intermediate its ends to a greater width than adjoining portions, said portion of greater width being constructed and arranged to bend the body portion away from the pin when said portion is pressed to reduce its width, to move the guard and pin outward longitudinally relative to each other a distance sufficient to disengage the free end of the pin from the guard, and also to cause upward movement of the guard member, and simultaneous downward pressure on the pin member to effect the opening of the pin when said free end is disengaged so that the pin may be inserted into or extracted from engagement with an article, said guard, body and pin members being integral, and the guard member being of substantial V-shape in cross section, and a formation adjacent the pointed end of the pin member interlocking with a formation on the portion of the guard contacted by the pin member when the safety pin is closed, to hold the pin securely in place until the pin is opened by pressing the flared portion.

3. A fastening device comprising a pin, a guard and a body of springy material supporting the pin and guard in cooperative engagement with the free end of the pin extending into the guard only a relatively short distance past the inner edge of the guard, said body comprising a channel section of springy material with its sides extending away from each other and with its concave side towards the pin, the sides of said channel extending at the greatest angle intermediate the ends of the channel and at angles which progressively decrease as the ends are reached, said portion of greatest width being constructed and arranged to bend the body portion away from the pin when said portion is pressed to reduce its width, to move the guard and pin outward longitudinally relative to each other a distance sufficient to disengage the free end of the pin from the guard.

4. A safety pin construction comprising a pin, a guard, and a body of springy material supporting said pin and guard in cooperative engagement with the free end of the pin extending into the guard only a relatively short distance past the inner edge of the guard, said body comprising a channel section of springy material with its sides extending angularly away from each other, and having a portion intermediate the ends of said channel section where the sides extend at a wider angle than adjoining portions, the concavity of said channel facing the pin, said portion of greater width being constructed and arranged to bend the body portion away from the pin when it is pressed to reduce its width to move the guard and pin outwardly longitudinally relative to each other a distance sufficient to disengage the free end of the pin from the guard, and also to cause upward movement of the guard, and simultaneous downward pressure on the pin to effect the opening of the pin when said free end is disengaged, so that the pin may be inserted into or extracted from engagement with an article.

5. A safety pin comprising a resilient elongated supporting body, a pin having the end remote from its point secured to one end of said supporting body, a keeper engageable and disengageable by the point of the pin secured to the other end of said body, said resilient body having manually sprung means to cause the point of the pin to disengage the keeper and to force the point of the pin away from the body after it has disengaged the keeper.

6. A fastening device comprising an elongated supporting body, a pin having the end remote from its point swingably secured to one end of said supporting body, a keeper engageable and disengageable by the point of the pin secured to the other end of said body, said fastening device having spring means biasing the point of the pin to swing into engagement with the keeper and having manually operable means for opposing and overcoming the action of said spring means to force the point of the pin to swing away from the keeper.

7. A fastening device comprising an elongated supporting body, a pin having the end remote from its point swingably secured to one end of said supporting body, a keeper engageable and disengageable by the point of the pin swingably secured to the other end of said body, said fastening device having spring means biasing the keeper to swing into engagement with the point of the pin and having manually operable means for opposing and overcoming the action of said spring means to force the keeper to swing away from the point of the pin.

SALEM E. MUNYER, Jr.